Aug. 8, 1944.    G. C. JERMAN    2,355,165
SAFETY HOSE CLAMP
Filed Dec. 10, 1943
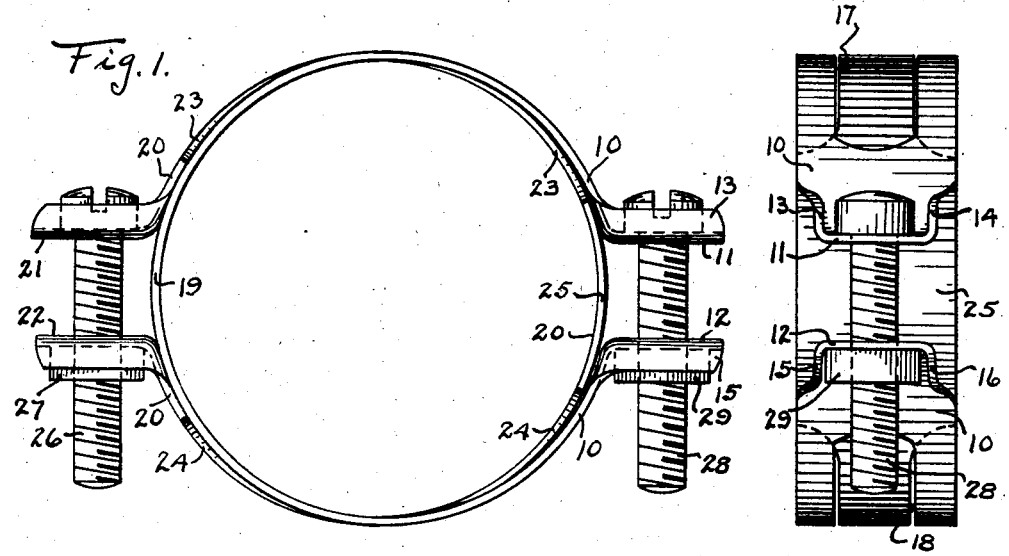
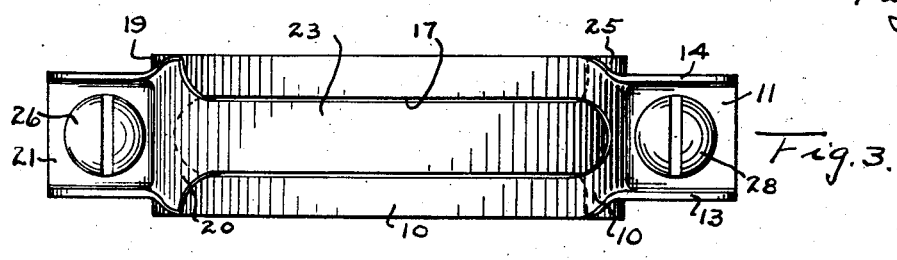
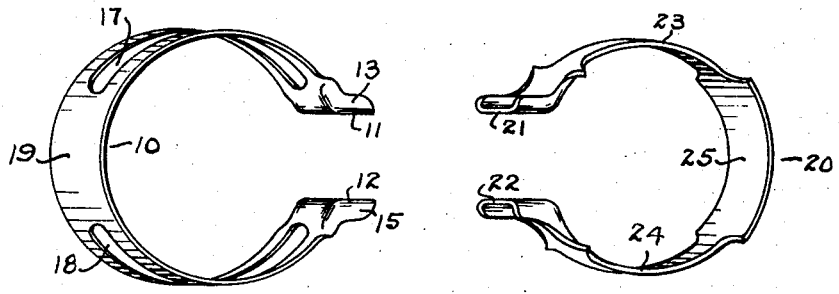
INVENTOR.
George C. Jerman,
By Herbert A. Minturn,
Attorney.

Patented Aug. 8, 1944

2,355,165

UNITED STATES PATENT OFFICE 2,355,165

SAFETY HOSE CLAMP

George C. Jerman, Columbus, Ind., assignor to Verner E. Sprouse and Ada Sprouse, Columbus, Ind., doing business as V. E. Sprouse Company, a copartnership.

Application December 10, 1943, Serial No. 513,678

5 Claims. (Cl. 24—19)

This invention relates to a hose clamp of the type adapted to secure a flexible hose to a rigid member and has for a primary object the provision of a safety factor in the event a clamping screw may break or become released in any manner.

A further primary object of the invention is to provide a simplified structure which may be readily produced at relatively low cost with a minimum number of parts. The invention comprises essentially a clamp within a clamp, wherein all of the metallic members gripping the hose or the like are placed in tension. Furthermore, the invention provides for initially tensioning the bridge member between and under the two outturned ears which are employed to receive the clamping bolt or screw for tightening the clamp about the hose.

These and many other objects and advantages of the invention will become apparent to those versed in the art in the following description of one particular form of the invention as illustrated in the accompanying drawing, in which Fig. 1 is a view in end elevation of a structure embodying the invention;

Fig. 2, a view in side elevation;

Fig. 3, a top plan view;

Fig. 4, a view in perspective on a reduced scale of one strap element; and

Fig. 5, a view in perspective also on a reduced scale of the other strap element of the clamp.

Like characters of reference indicate like parts throughout the several views in the drawing.

A strap 10 is formed to have outturned ends 11 and 12, each having respectively reinforcing side flanges 13, 14, and 15, 16 turned from the side edges thereof and extending for a portion along the sides of the adjacent portions of the ends of the strap 10. The strap 10 is further provided with a pair of slots 17 and 18 centrally disposed, the slot 17 starting adjacent the end 11 and the slot 18 starting adjacent the end 12 to terminate by their opposite ends to leave a full width portion 19 of the strap 10 therebetween.

Another strap 20, Fig. 5, is formed to have side flanged ends 21 and 22 from which extend respectively lengths 23 and 24 reduced in width to permit free passage through the slots 17 and 18 of the strap 10. These reduced width portions 23 and 24 are substantially equal to the lengths of the slots 17 and 18. The strap 20 is provided with a full width portion 25 intermediate the reduced width portions 23 and 24 and the portion 25 has a width preferably equal to that of the portion 19 of the strap 10. All of these relative widths of the strap portions will vary some as the diameter of the hose to be clamped may vary.

The straps 10 and 20 are assembled together to have the reduced width portions 23 and 24 extending respectively through the slots 17 and 18 whereby the ends 21 and 22 will be outside of and over the portion 19 of the strap 10, and the portion 25 of the strap 20 will be positioned to have the ends 12 and 13 of the strap 10 outside of and over this portion 25. Both straps, during the forming and assembling operations, will be formed to define, when finished, a complete circle therebetween, as indicated in Fig. 1. Normally the ends 12, 13 and 21, 22 will have widths greater than those of the slots 17 and 18 so that after the two straps 10 and 20 are once assembled and formed, they may not be separated one from the other except by manipulating the nonslotted band angularly in respect to the other to turn it on a diameter to permit its removal through the slot of the other band without the necessity of twisting or bending either clamp band.

A clamp bolt 26 is carried through holes in the respective ends 21 and 22 to screw-threadedly engage a nut member 27 abutting the one end 22 while the head of the bolt 26 abuts the other end 21. Likewise a bolt 28 is placed through holes in the respective ends 11 and 21 to have the bolts screw-threadedly engage the nut member 29 abutting the end 12 while the head of the bolt abuts the end 11. It will be noted, Figs. 1 and 2, that the wide portions of the respective straps 10 and 20 extend across the gaps between the respective ends of the straps and that these portions will be under tension in the clamping condition. Further, each strap may be reduced in diameter by its own individual control bolt 26 or 28 as the case may be, the practice, however, being that both straps should be drawn up equally in tension as near as possible. Should the threads of one of the bolts become stripped, the retaining nut lost off, or the head of the bolt let loose or break off from the bolt, the release of the particular strap thereby affected does not cause the release of the other strap nor the reduction in any way of the clamping action about the hose other than to impart all of the clamping stress to the one holding strap. In other words, by having the particular assembly arranged as above described, the failure of one bolt does not cause a complete failure of the clamp. The present clamps, provided with but one bolt, completely fail when the one bolt becomes released in any manner. This is of primary importance in the present usage of the clamp herein described and shown, on combat airplanes where the failure of a single clamp on a vital hose line would mean the complete failure of the airplane.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. A hose clamp comprising a hose encircling, open side band; an outturned foot at each end of the band normally spaced one from the other; said band having two longitudinal slots therethrough, each slot initiating adjacent one of said feet and terminating to leave a full width portion of the band therebetween of a length substantially longer than the spacing between said feet; a second hose encircling, open side band of substantially the same diameter as that of said first band; an outturned foot on each end of the second band; said second band having an arcuate length within said first band carrying across the open side thereof and extending by reduced width portions respectively through the slots of said first band to position the second band feet outside of the first band; means for pulling said first band feet, one toward the other; and additional means for pulling said second band feet, one toward the other.

2. A hose clamp comprising a hose encircling, open side band; an outturned foot at each end of the band normally spaced one from the other; said band having two longitudinal slots therethrough, each slot initiating adjacent one of said feet and terminating to leave a full width portion of the band therebetween of a length substantially longer than the spacing between said feet; a second hose encircling, open side band of substantially the same diameter as that of said first band; an outturned foot on each end of the second band; said second band having an arcuate length within said first band carrying across the open side thereof and extending by reduced width portions respectively through the slots of said first band to position the second band feet outside of the first band; means for pulling said first band feet, one toward the other; and additional means for pulling said second band feet, one toward the other; said second band having a portion outside of said first band and adjacent each of the second band feet wider than said slots.

3. A hose clamp comprising a hose encircling, open side band; an outturned foot at each end of the band normally spaced one from the other; said band having two longitudinal slots therethrough, each slot initiating adjacent one of said feet and terminating to leave a full width portion of the band therebetween of a length substantially longer than the spacing between said feet; a second hose encircling, open side band of substantially the same diameter as that of said first band; an outturned foot on each end of the second band; said second band having an arcuate length within said first band carrying across the open side thereof and extending by reduced width portions respectively through the slots of said first band to position the second band feet outside of the first band; means for pulling said first band feet, one toward the other; and additional means for pulling said second band feet, one toward the other; the length of said full width portion of said first band between its slots being at least equal to the circumferential distance between the feet of said second band.

4. A hose clamp comprising two individual hose encircling clamp bands, one passing circumferentially through the other; and separate means for each band for placing the respective band under tension independently of the other band.

5. A hose clamp comprising two individual hose encircling clamp bands, one passing circumferentially through the other; and separate means for each band for placing the respective band under tension independently of the other band; one of said bands being slotted through two portions of the length thereof to leave a full width band portion between the slotted portions; and the other of said bands having reduced width portions slidingly extending respectively through said one band slots.

GEORGE C. JERMAN.